(12) United States Patent
Flikkema et al.

(10) Patent No.: US 7,392,754 B2
(45) Date of Patent: Jul. 1, 2008

(54) DOWN PRESSURE ADJUSTER FOR SEED PLANTER

(75) Inventors: Kevin A. Flikkema, Justice, IL (US); Chad M. Johnson, Arlington Heights, IL (US); Travis Lester Harnetiaux, Woodridge, IL (US)

(73) Assignee: CNH America LLC, Racine, WI (US)

( * ) Notice: Subject to any disclaimer, the term of this patent is extended or adjusted under 35 U.S.C. 154(b) by 452 days.

(21) Appl. No.: 11/194,428

(22) Filed: Aug. 1, 2005

(65) Prior Publication Data

US 2007/0022926 A1    Feb. 1, 2007

(51) Int. Cl.
*A01C 5/00*     (2006.01)
*A01C 7/18*     (2006.01)

(52) U.S. Cl. .......................................................... 111/63
(58) Field of Classification Search ............. 111/18–22, 111/52–69
See application file for complete search history.

(56) References Cited

U.S. PATENT DOCUMENTS

| 3,452,826 | A | 7/1969  | Lehman          |
| 4,030,428 | A | 6/1977  | Truax           |
| 4,142,589 | A | 3/1979  | Schlagenhauf    |
| 4,213,506 | A | 7/1980  | Hake            |
| 4,528,920 | A | 7/1985  | Neumeyer        |
| 4,623,024 | A | 11/1986 | Schlenker       |
| 4,700,785 | A | 10/1987 | Bartusek et al. |
| 4,702,323 | A | 10/1987 | Smit et al.     |
| 4,766,962 | A | 8/1988  | Frase           |
| 5,136,518 | A | 8/1992  | Glvoer          |
| 5,529,128 | A | 6/1996  | Peterson et al. |
| 5,544,709 | A | 8/1996  | Lowe et al.     |
| 5,555,824 | A | 9/1996  | Stufflebeam et al. |

*Primary Examiner*—Christopher J. Novosad
(74) *Attorney, Agent, or Firm*—Rebecca Henkel

(57) ABSTRACT

A down pressure adjustment mechanism for a planter provides a self-contained spring cartridge holding a preloaded compression spring that may be moved between a limited number of mounting points to provide for convenient and significant changes in down pressure without the need for specialized tools or the like.

22 Claims, 2 Drawing Sheets

DOWN PRESSURE ADJUSTER FOR SEED PLANTER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to seed planters for dispensing individual seeds at a controlled rate into a seed furrow, and specifically, to an adjusting mechanism controlling the down pressure on a planter unit.

Seed planters dispense seeds at a controlled rate into a seed furrow as a planter is advanced along the ground. In a typical arrangement, a tractor is coupled to tow a toolbar to which is attached, in parallel spaced apart relationship, a plurality of planting units.

Each planting unit typically includes a seed hopper and a seed meter for dispensing seeds at a controlled rate as the planting unit moves over the ground. The planting unit may include on its lower surface a furrow-opening disk for opening a furrow for the seeds, a furrow closing disk for closing the furrow about the seeds, and a trailing wheel that tamps the earth down on the furrow. In order that these disks and wheels properly engage the soil, the planting unit may be coupled to the tow bar with a pivoting four-bar linkage. A tension spring mounted between the tow bar and one of the arms of the linkage provides a downward pressure on the planting unit ensuring that it tracks the ground surface regardless of changes in height of the tow bar relative to the surface under the planter.

It may be desirable to adjust the down pressure on the planting units according to the condition of the field. A soft till field may require less pressure, for example, than a field with no till and greater surface irregularity. For this purpose, the tension spring may have a threaded adjuster or the like that may be turned to change the tension on the spring.

Changing the down pressure on many planting units using a threaded adjuster can be time consuming. The threaded elements are prone to contamination or corrosion making it difficult to turn the adjusters without special tools and the nature of the adjustment process makes it difficult to provide consistent down pressure on multiple planting units.

BRIEF SUMMARY OF THE INVENTION

The present invention provides an improved down adjuster for a planting unit using a compression spring installed in a preloaded condition on a spring cartridge. One end of the spring cartridge attaches to a pivoting arm of the connection between the planter unit and the toolbar, and the other end is received by a bracket having multiple mounting points corresponding to a limited number of useful increments in down pressure. The spring cartridge is easily moved between the multiple mounting point positions in a no-load configuration and held to a given mounting point by a slide pin which also serves as a pivot about which the spring cartridge may move during operation.

Specifically then, the present invention provides a down pressure adjuster for a planter including a mounting bracket and at least one arm attached to the mounting bracket to pivot about a first horizontal axis. A spring cartridge provides a core supporting a first and second end cap and capturing therebetween around the core, a helical compression spring. A first attachment point on one of the mounting bracket and arm pivotally receives the first end cap to pivot about a second horizontal axis. A plurality of second attachment points on the other of the mounting bracket and arm, individually releasably, and pivotally receive the second end cap to pivot about a third horizontal axis. Each of the second attachment points provides a different compression of the helical compression spring for a given angle of the arm.

The core may be an extensible slide having one end attached to the first end cap and a second end attached to the second cap. The slide may block rotation of the end caps with respect to each other about an axis of extension. The extensible slide may include stops limiting the extension of the extension slide to a maximum extension.

The extension slide may be a telescoping tube, for example, and the stops may be provided by an outward flange on one of the tubes engaging with an inward flange on the other tube. The helical spring may have a compressive preload at the maximum extension of the core, for example, a preload of greater than 100 lbs. and in the preferred embodiment at least 300 lbs.

The second attachment points may allow attachment to the spring cartridge with the arm in a full downward position and the extensible slide at maximum extension, and may produce different compressions of the helical compression spring when the arm is returned to an operating angle.

At least one of the first and second caps may be provided in part by a removable element attached to the core to retain one end of the helical spring.

The removable element may provide at least three points of support for the end of the helical spring.

The second mounting points may be holes in a C-bracket attached to the mounting bracket and having horizontally, outward extending tabs flanking one of the first and second end caps. The second end cap may include mounting holes extending generally perpendicularly to the axis of the spring cartridge and the second mounting points may be a series of holes that may align with the mounting holes. The adjuster may further include a pin removably inserted through the mounting hole and one of the second mounting points.

The mounting points may be slots allowing manual alignment of the mounting hole and a portion of each of the slots for a given angle of the arm. The given angle of the arm may correspond to a full extension of the spring cartridge.

At least two horizontal arms may pivot about the first horizontal axis and a bar may extend horizontally therebetween and the bar may support one of the first and second attachment points.

The adjuster may further include at least two horizontally separated arms pivoting about a fourth horizontal axis different from the first horizontal axis to provide a four bar linkage.

DETAILED DESCRIPTION OF THE PREFERRED EMBODIMENT

Figure 1:
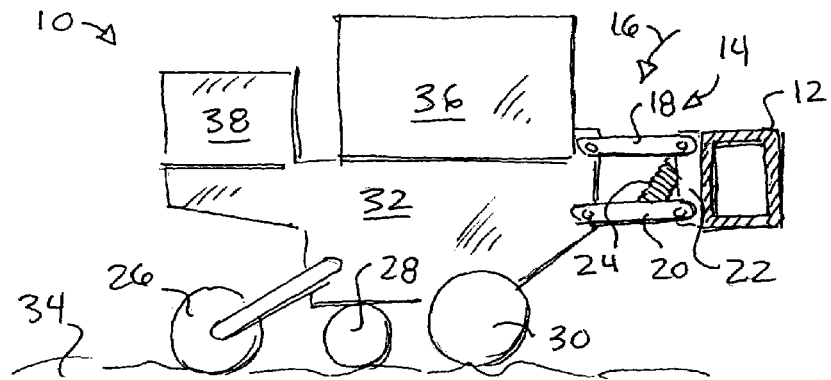
FIG. 1 is a right side elevational view of a planting unit joined to a toolbar by the down pressure adjuster mechanism of the present invention having a bracket attached to the toolbar and rearwardly extending pivoting arms.

Referring now to FIG. 1, a planter unit 10 may be attached by means of the down adjuster mechanism 14 to a toolbar 12 towed by a tractor or the like (not shown). The down adjuster mechanism 14 provides an approximately linear motion of the planter unit 10 with respect to the toolbar 12 using a four-bar linkage. The four bar linkage is comprised of upper swing arms 18 and lower swing arms 20 pivotally attached to a bracket 22 on the toolbar 12 at one end and to the planter unit 10 at the other end to pivot about two respective horizontal axes.

A spring cartridge 24, as will be described in more detail below, extends between the bracket 22 and an attachment point connecting to the lower arms 20 to provide a down pressure 16.

Generally, the planter unit 10 includes a furrow opening disk 30, a pair of furrow closing disks 28 and a press wheel 26 for pressing down on the closed furrow. A main body 32 of the planter unit 10 supports each of these disks and wheels 26, 28, and 30 must be held downward against the surface of the field 34 for proper operation. The planter unit 10 will also include a seed hopper 36 and a pesticide hopper 38 whose weights will fluctuate as seed and pesticide are used during the planting operation.

Figure 2:
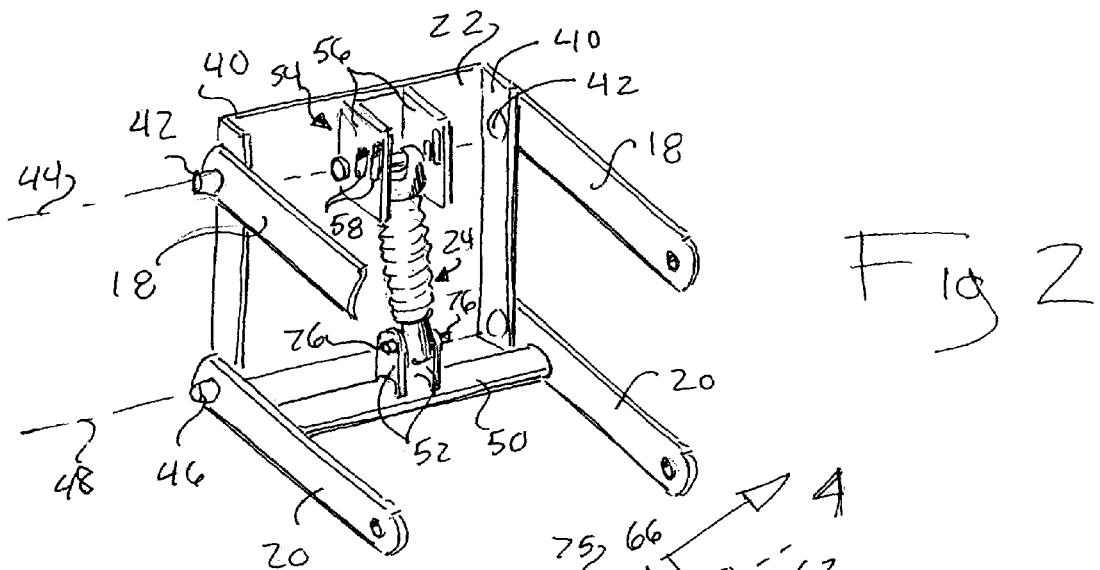
FIG. 2 is a perspective view of the bracket and pivoting arms of FIG. 1 showing the positioning of a spring cartridge between a bar spanning the lower arms and one of multiple mounting points on a C-bracket attached to the mounting bracket.

Referring now to FIG. 2, the bracket 22 may include left and right rearwardly extending (with respect to motion of the tractor) tabs 40 at the left and right edges of the bracket 22, respectfully. Bolts 42 extending along a horizontal axis 44 pivotally attach one end of each of arms 18 to the bracket 22 at the top left and right side of the bracket 22, whereas bolts 46 extending along a horizontal axis 48 parallel to the horizontal axis 44, pivotally attach one end of lower arms 20 to the bracket 22 at the lower left and right side of the bracket 22.

A horizontally extending bar 50 joins the lower arms 20 at their inner surfaces near the horizontal axis 48 so that they pivot together. Two mounting tabs 52 extend upward from the bar 50 to receive a lower end of the spring cartridge 24 therebetween to pivot about a horizontal axis displaced from, but generally parallel to horizontal axes 44 and 48.

An upper end of the spring cartridge 24 is received by a C-bracket 54 having rearward extending tabs 56 with a series of slots 58 opposed along horizontal axes parallel to horizontal axes 44 and 48. The slots 58 provide mounting points for the upper end of the spring cartridge 24 allowing it to pivot about the axis of one of the slots 58.

Figure 3:
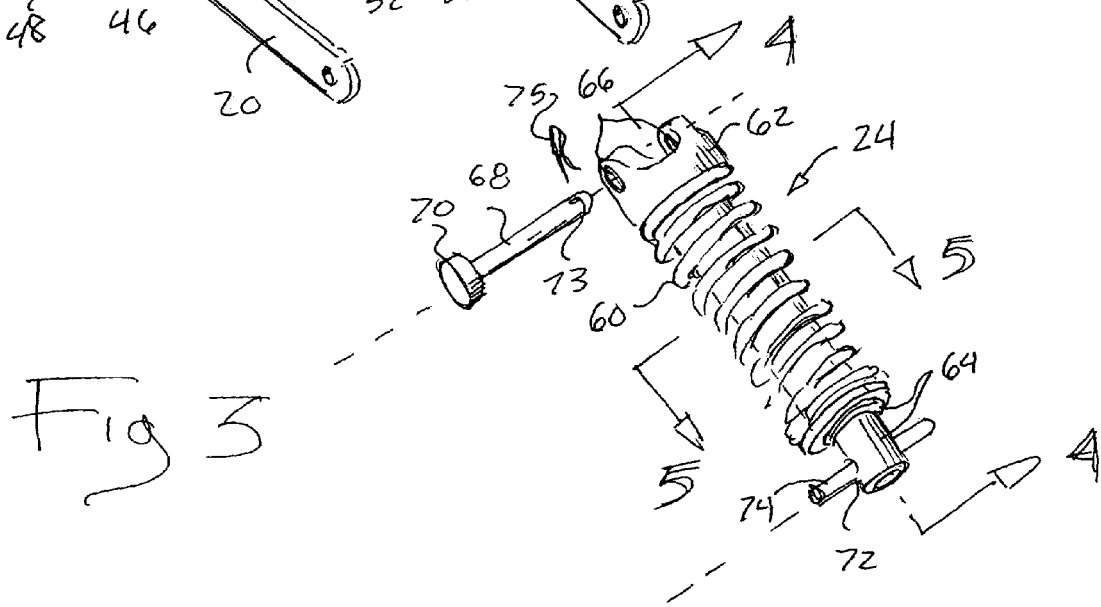
FIG. 3 is a perspective exploded view of the spring cartridge of FIG. 2 showing pins used to provide pivotal mounting of the spring cartridge to the arms and mounting bracket.

Referring now to FIGS. 2 and 3, the spring cartridge 24 may include a helical compression spring 60 held captive between an upper end cap 62 and a lower end cap 64. The upper end cap 62 includes a horizontal bore 66 that may receive a removable slide pin 68. The slide pin 68 may pass through any of the pairs of aligned slots 58 in the C-bracket 54 and through the bore 66 to pivotally attach the upper end cap 62 to the C-bracket 54 between the tabs 56. The slide pin 68 has a head 70 at one end and a hole 73 receiving a snap pin 75 at the other end, to retain it in place.

The lower end cap 64 includes a second bore 72 parallel to the first bore 66 receiving a roll pin 74 also along a horizontal axis. The roll pin 74 may be received through corresponding horizontally aligned holes 76 in the tabs 52 so as to pivotally mount the lower end cap 64 to the tabs 52. Generally the roll pin 74 is not removed during adjustment of the down adjuster mechanism 14.

Figure 4:
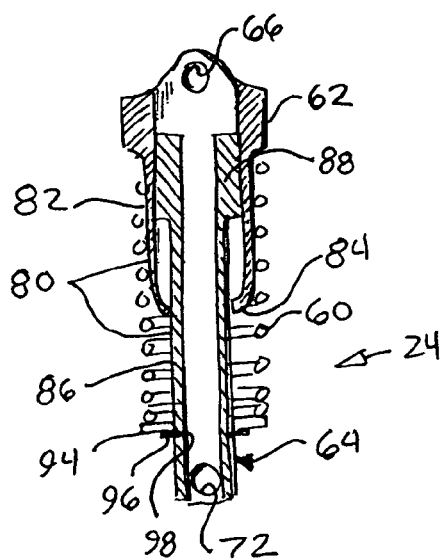
FIG. 4 is a cross-sectional view of the spring cartridge of FIG. 3 showing inter-engaging flanges of telescoping tubes forming a core of the spring cartridge that guides the expansion and contraction of the spring and limits the spring's full extension.

Referring also to FIG. 4, the end caps 62 and 64 are joined by a telescoping core 80 fitting within the helical compression spring 60. A first tube 82 of the telescoping core attached to upper end cap 62 provides a downwardly extending tube having an inwardly facing flange 84. A second tube 86 of the telescoping core provides a generally cylindrical tube extending upward from the lower end cap 64 (and forming part of the lower end cap 64) and expanding to produce an outwardly extending flange 88 fitting within tube 82. The interaction of the flanges 88 and 84 limit the maximum extension of the telescoping core 80 and thus the maximum separation of bores 66 and 72.

Figure 5:
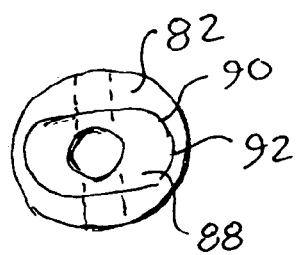
FIG. 5 is a cross-sectional view taken along lines 5-5 of FIG. 3 showing a keying between the telescoping tubes that prevent relative rotation along their axes.

Referring to FIG. 5, the inner diameter 90 of the tube 82 is non-circular and engages with a corresponding non-circular outer diameter 92 of the flange 88 to prevent rotation of the two tubes 82 and 86 along their axis of extension assuring alignment of bores 66 and 72.

Telescoping core 80 is assembled by inserting tube 86 downward through tube 82 to extend through the helical compression spring 60 and extending out of the end. A washer 94 is then placed over the end of tube 86 and a split ring 96 fitting within a groove 98 blocks the washer 94 from further outward expansion. The washer 94 and split ring 96 and the end of the tube 86 thus provide the lower end cap 64.

The split ring 96 provides an axially stable mounting point preventing rocking of the washer 94 under forces of the helical compression spring 60. In the preferred embodiment, the helical compression spring 60 will have a preload of 300 lbs. when the telescoping core 80 is fully extended with flange 88 abutting flange 84. Further expansion of the spring cartridge 24, prevented by the flanges 88 and 84, allows easy handling of the preloaded helical compression spring 60.

Figure 6:
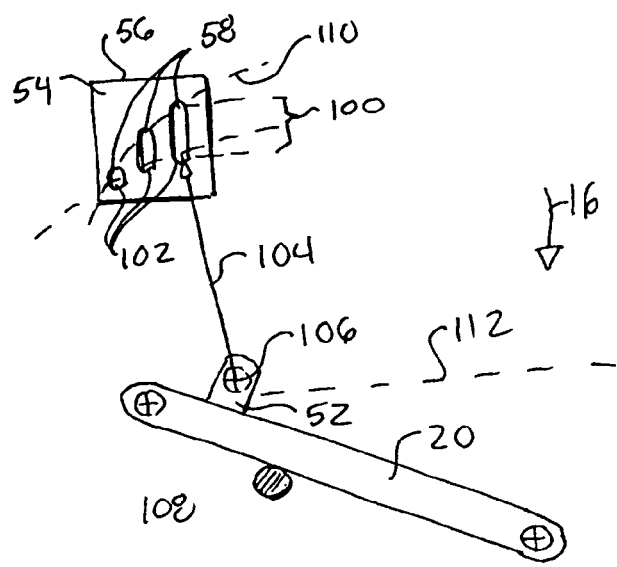
FIG. 6 is a simplified left side elevational view of the lower pivoting arms and the C-bracket of FIG. 2 showing the use of slots to allow positioning of the spring cartridge in a no-load state when the lower pivoting arms are in a fully downward extension while providing different degrees of spring compression when the lower arms are returned to a more horizontal operating position.

Referring now to FIG. 6, the tabs 56 of the C-bracket 54 include pairs of horizontally aligned slots 58 of varying heights 100 having lower starting points 102 that form a constant radius 104 about a pivot point 106 defined by the attachment of the lower end of the spring cartridge 24 to the tabs 52 when the arm 20 is in its lowermost position against a stop 108. This no-load position may be obtained by raising the toolbar 12 shown in FIG. 1 for the purpose of adjustment. The radius 104 is equal to the separation of bores 66 and 72 when the spring cartridge 24 is in its full extension position.

It will thus be understood that the attachment of the upper end cap 62 to the C-bracket 54 by fitting the slide pin 68 through one of the slots 58 may be performed without additional compression of the helical compression spring 60 beyond that preload held by the end caps 62, 64 and the flanges 88 and 84 when the spring cartridge 24 is in full extension position. This allows attachment of the spring cartridge 24 to any of the slots 58 without the need for specialized tools.

The tops of the slots 58 form a second curve 110 deviating from the radius 104 to provide varying amounts of compression of the spring cartridge 24 (to less than its full extension position) when the arm 20 is moved to a normal operating position 112. The height of the slots 58 may be selected to provide complete flexibility in setting the amount of down pressure 16 obtained as one moves from the rearward most slot 58 providing the least down pressure 16 to the most forward slot 58 which in this case is a single hole providing the most down pressure.

It is specifically intended that the present invention not be limited to the embodiments and illustrations contained herein, but include modified forms of those embodiments including portions of the embodiments and combinations of elements of different embodiments as come within the scope of the following claims.

We claim:

1. A down pressure adjuster for a planter comprising:
   a mounting bracket;
   at least two horizontal arms attached to the mounting bracket to pivot about a first horizontal axis;
   a spring cartridge providing a core and including a first and second end caps, the end caps capturing therebetween, around the core, a helical compression spring;
   a first attachment point on one of the mounting bracket and at least one of the at least two horizontal arms pivotally receiving the first end cap to pivot about a second horizontal axis; and
   a plurality of second attachment points on an other of the mounting bracket and at least one of the at least two horizontal arms, each releasably and pivotally receiving the second end cap to pivot about a third horizontal axis;
   wherein each of the plurality of second attachment points provides a different downward load to the helical compression spring for a given angle of the at least one of the at least two horizontal arms.

2. The down pressure adjuster of claim 1 wherein the core is an extensible slide having one end attached to the first end cap and a second end attached to the second end cap.

3. The down pressure adjuster of claim 2 wherein the extensible slide blocks rotation of the end caps with respect to each other about an axis of extension.

4. The down pressure adjuster of claim 2 wherein the extensible slide includes stops limiting an extension of the extension slide to a maximum extension.

5. The down pressure adjuster of claim 4 wherein the helical spring has a compressive preload at the maximum extension.

6. The down pressure adjuster of claim 5 wherein the compressive preload is greater than 100 pounds.

7. The down pressure adjuster of claim 4 wherein the plurality of second attachment points allow attachment to the spring cartridge with the at least one of the at least two horizontal arms in a full downward position and the extensible slide at maximum extension and produce different compressions of the helical compression spring when the at least one of the at least two horizontal arms is returned to an operating angle.

8. The down pressure adjuster of claim 2 wherein the extensible slide is telescoping tubes.

9. The down pressure adjuster of claim 8 wherein the one of the telescoping tubes includes an inward flange and an other of the telescoping tubes includes an outward flange that limits full extension of the telescoping tubes.

10. The down pressure adjuster of claim 1 wherein at least one of the first and second end caps is provided in part by a removable element attached to the core to retain one end of the helical spring.

11. The down pressure adjuster of claim 10 wherein the removable element provides an axially stable mounting point preventing rocking of the at least one of the first and second end caps.

12. The down pressure adjuster of claim 1 wherein the second attachment points are holes in a C-bracket attached to the mounting bracket and having horizontally outward extending tabs flanking one of the first and second end caps.

13. The down pressure adjuster of claim 1 wherein the second end cap includes a mounting hole extending generally perpendicularly to the axis of the spring cartridge and the second attachment points are a series of holes that may align with the mounting hole, and further including a pin removably inserted through the mounting hole and one of the holes of the second attachment points.

14. The down pressure adjuster of claim 13 wherein the attachment points are slots allowing manual alignment of the mounting hole and a portion of each of the slots for a given angle of the at least one of the at least two horizontal arms.

15. The down pressure adjuster of claim 14 wherein the given angle of the at least one of the at least two horizontal arms corresponds to a full extension of the spring cartridge.

16. The down pressure adjuster of claim 1 including a bar extending horizontally between the at least two horizontal arms, and wherein the bar supports one of the first and second attachment points.

17. The down pressure adjuster of claim 1 including at least two horizontally separated arms pivoting about a fourth horizontal axis different from the first horizontal axis to provide a four bar linkage.

18. A down pressure adjuster for a planter comprising:
    a mounting bracket;
    at least one arm attached at a first end to the mounting bracket to pivot about a first horizontal axis;
    a spring cartridge providing an extensible core and first and second end caps, the end caps capturing therebetween, around the extensible core, a helical compression spring;
    a first attachment point on one of the mounting bracket and arm pivotally receiving the first end cap to pivot about a second horizontal axis;
    a plurality of second attachment points on an other of the mounting bracket and arm, each releasably and pivotally receiving the second end cap to pivot about a third horizontal axis,
    wherein each of the plurality of second attachment points provides a different downward load to the helical compression spring for a given angle of the arm;
    wherein the second end cap includes a mounting hole extending generally perpendicularly to the axis of the spring cartridge and the second attachment points are a series of holes that may align with the mounting hole, and further including a pin removably inserted through the mounting hole and one of the holes of the second attachment points.

19. A method of manufacturing an agricultural implement that includes a mounting bracket and at least two horizontal arms supported by the mounting bracket to pivot about a first horizontal axis to provide an adjustable downward pressure on at least one of the at least two horizontal arms, the method comprising the steps of:
    providing a spring cartridge including a core and first and second end caps, the end caps capturing therebetween, around the core, a helical compression spring;

attaching the first end cap at a first attachment point on one of the mounting bracket and at least one of the at least two horizontal arms for pivotal movement about a second horizontal axis;

releasably attaching the second end cap at a plurality of second attachment points on an other of the mounting bracket and at least one of the at least two horizontal arms for pivotal movement about a third horizontal axis, wherein each of the plurality of second attachment points provides a different downward load to the helical compression spring for a given angle of the at least one of the at least two horizontal arms.

20. The method of claim 19 wherein the step of providing a spring cartridge includes the step of providing a cartridge wherein the second end cap includes a mounting hole extending generally perpendicularly to the axis of the spring cartridge and wherein the step of releaseably attaching includes attaching at the second attachment points via a series of holes that may align with the mounting hole and a pin removably inserted through the mounting hole and one of the holes of the second attachment points.

21. An agricultural implement comprising:

a planter having at least two planting implements extending therefrom to engage a ground with respective first and second downward pressures to perform a planting process as the planter is pulled across the ground by a vehicle; and a mounting bracket attached to the planter and configured to engage the planter to the vehicle to be pulled across the ground by the vehicle, the mounting bracket including:
   (i) at least one arm attached at a first end to the mounting bracket to pivot about a first horizontal axis;
   (ii) a spring cartridge providing a core and including a first and second end caps, the end caps capturing therebetween, around the core, a helical compression spring;
   (iii) a first attachment point on one of the mounting bracket and arm pivotally receiving the first end cap to pivot about a second horizontal axis; and
   (iv) a plurality of second attachment points on an other of the mounting bracket and arm, each releasably and pivotally receiving the second end cap to pivot about a third horizontal axis;

wherein each of the plurality of second attachment points adjusts a relative connection position of the planter to the vehicle and a downward load to the helical compression spring for a given angle of the arm to adjust the respective first and second downward pressures of the at least two planting implements.

22. The down pressure adjuster of claim 21, wherein at least one of the plurality of second attachment points provides a downward load to the helical compression spring such that each of the at least two planting implements engage the ground when being pulled by the vehicle.

* * * * *